United States Patent [19]
Ratz et al.

[11] Patent Number: 5,203,497
[45] Date of Patent: Apr. 20, 1993

[54] COMMUNICATING THERMOSTAT

[75] Inventors: James W. Ratz, Bloomington; Robert J. Schnell, Plymouth, both of Minn.

[73] Assignee: Honeywell Inc., Minneapolis, Minn.

[21] Appl. No.: 811,765

[22] Filed: Dec. 20, 1991

[51] Int. Cl.⁵ .................................... G05D 23/00
[52] U.S. Cl. .................................... 236/46 R; 236/51
[58] Field of Search ............... 236/51, 46 R; 165/12

[56] References Cited

U.S. PATENT DOCUMENTS

| | | | |
|---|---|---|---|
| 4,335,847 | 6/1982 | Levine .................... | 236/46 R |
| 4,497,031 | 1/1985 | Froehling et al. ........ | 165/22 |
| 4,606,401 | 8/1986 | Levine et al. ............ | 165/12 |
| 4,661,914 | 4/1987 | Mulokey et al. .......... | 236/46 R |
| 4,819,714 | 4/1989 | Otsuka et al. ........... | 165/12 |

Primary Examiner—William E. Wayner
Attorney, Agent, or Firm—Robert B. Leonard

[57] ABSTRACT

A thermostat providing external communication comprising two microprocessors. One microprocessor may be dedicated to the external communication while the other microprocessor runs the application programming. The thermostat is separated into a thermostat housing and subbase. One microprocessor may be located within the thermostat housing with the other located within the subbase. This allows for changing the applications programming through replacement either the housing or the subbase. Replacement of only one portion of the thermostat is cheaper and can be easier.

5 Claims, 6 Drawing Sheets

COMMUNICATING THERMOSTAT

BACKGROUND OF THE INVENTION

The present invention is directed to the field of thermostats and more particularly relates to thermostats having the ability to communicate externally.

Thermostats are well known devices for controlling temperature within a selected space or grouping of spaces. Microprocessor based thermostats are now widely available as reliable devices for achieving temperature control.

Typically, an operator could enter a series of times and temperatures for controlling selected space or grouping of spaces through a particular temperature according to the schedule desired by the operator. Thereafter, the thermostat would automatically control the space or grouping of spaces temperature according to the schedule entered by the operator.

One problem associated with this kind of a thermostat was that the operator had to be physically located at the thermostat in order to make changes to the time or temperature data. If for example it was desired to change the temperature in the middle of the night, it was inconvenient to get out of bed and go to the thermostat to change the temperature.

Another problem was that as advancements were made to thermostat technology, old thermostats became obsolete. It would be beneficial if microprocessor based thermostats could be modified without a complete changeout of thermostat equipment.

SUMMARY OF THE INVENTION

The present invention is a communicating thermostat which has two microprocessors. The first microprocessor is connected to the temperature sensor, a data entry means and a display and basically operates as an interface between an operator and the thermostat. A second microprocessor is connected to the HVAC system to be controlled and to a network bus through a bus transceiver. The second microprocessor does the actual control HVAC system through use of energy management programming and time and temperature scheduling. The bus transceiver is connectable to a network bus so that the thermostat unit is capable of receiving instructions from an external controller also connected to the network bus. The external controller is capable of changing the time and temperature data stored in the thermostat.

In one preferred embodiment, one microprocessor is located in a subbase of the thermostat while another microprocessor is located in the thermostat housing. In this way by merely changing the thermostat housing, a new set of functions can be installed in a given HVAC system.

DETAILED DESCRIPTION OF THE PREFERRED EMBODIMENT

Figure 1:
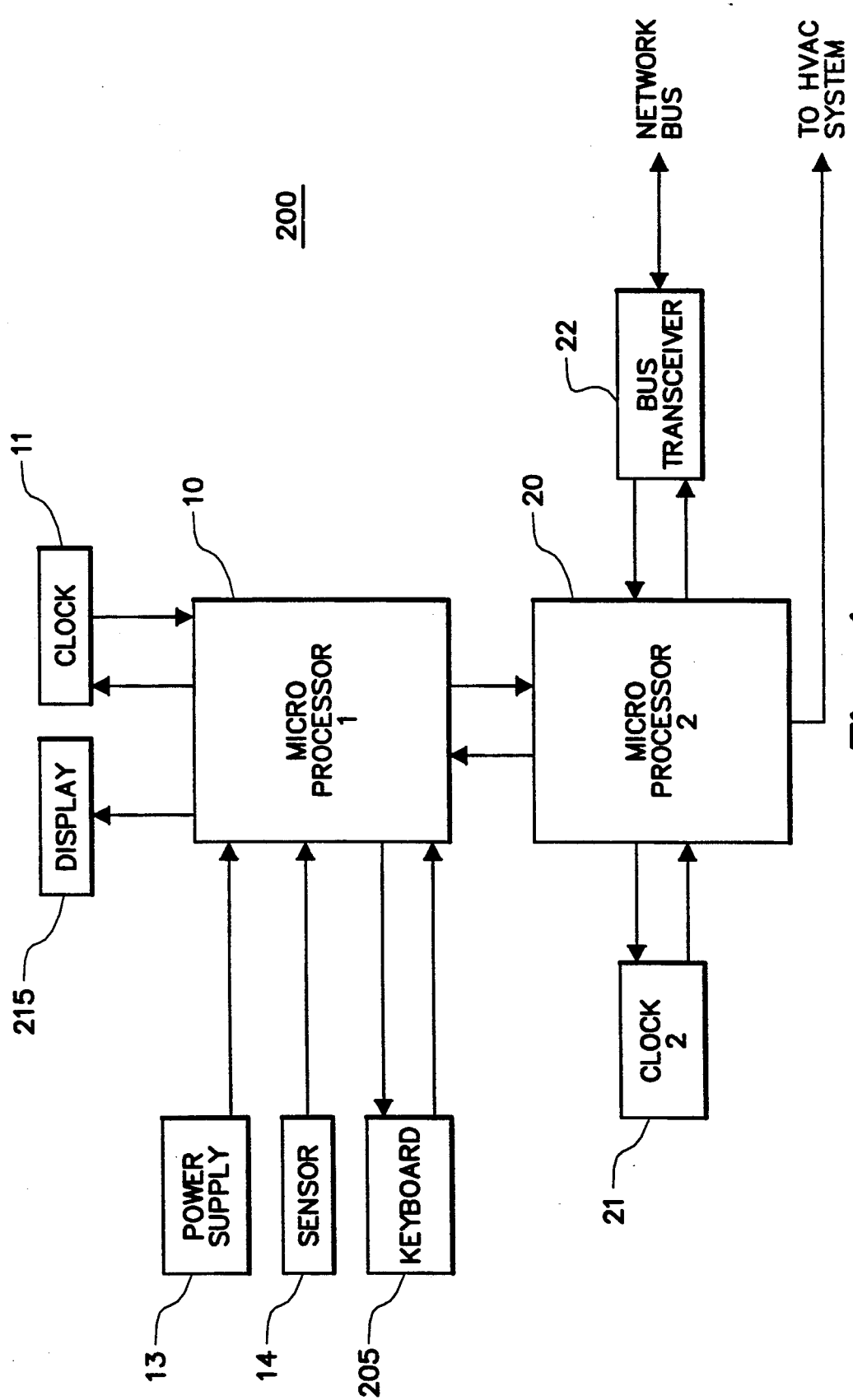
FIG. 1 is a block diagram of the inventive thermostat unit.

FIG. 1 is a block diagram of the presently inventive thermostat 200. The term thermostat unit as used herein refers to part physically located both on thermostat housing 201 and subbase 202. When the thermostat housing and subbase are combined, they form a thermostat.

Thermostat unit 200 in a preferred embodiment includes first microprocessor 10, first clock 11, display means 215, power supply 13, sensor 14, keyboard 205, second microprocessor 20, second clock 21 and bus transceiver 22. The interrelationship of these parts will now be described.

First microprocessor 10 acts essentially as a manmachine interface for use by the operator to enter data into the thermostat unit. Data entry means 205, in this case a keyboard, is provided so that time and temperature data may be entered into the thermostat so that the thermostat may control operation of the HVAC system according to a preselected schedule. In addition, keyboard 205 may allow an operator to manually override already entered time and temperature data. First microprocessor 10 includes memory for storage of time and temperature data.

Sensor 14 senses local air temperature, and produces a temperature signal representative of local air temperature. The temperature sensor may be, for example a thermistor. First microprocessor 10 receives the temperature signal and provides the temperature signal to display 215 for displaying of local temperature. The temperature signal is also sent to the second microprocessor 20 More on second microprocessor's 20 use of the temperature signal is described hereinbelow. Power supply 13 provides power to first microprocessor 10. As an example, power supply 13 may be a battery.

Display 215, may provide information such as, time, current temperature set point, scheduling information, and whether or not the thermostat operation has been overridden by an external portion of the system.

First clock 11 provides the first microprocessor 10 an accurate time base for use in communication with the display, power supply, sensor, keyboard and second microprocessor. Clock 11 may be a crystal oscillator.

Second microprocessor 20 serves two primary functions. First, second microprocessor 20 stores in a memory (not shown) energy management programs which allow the thermostat unit to efficiently operate the HVAC system. For two examples of stored temperature time scheduling of a thermostat, the reader is directed to U.S. Pat. Nos. 4,335,847 issued to Levine on Jun. 22, 1982 and U.S. Pat. No. 4,606,401 issued to Levine et al. on Aug. 19, 1986, both of which are incorporated herein by reference.

Secondly, second microprocessor 20 controls communications between the thermostat unit and other network units connected the network bus.

Bus transceiver 22 converts network bus signals into signals which can be received and executed by the second microprocessor 20. Second clock 21 is connected to the second microprocessor 20 to provide an accurate time base upon which communications between the first microprocessor and the second microprocessor can occur. Communications between the first and second microprocessors occurs using a communications protocol. One preferred protocol is the protocol disclosed in copending United States patent application Ser. No. 07/811,491 entitled Communication Method and Apparatus by Steven C. Nichols which is commonly assigned with the present application. This protocol is merely exemplary, and in no way is limiting to the present invention. The present invention could be equally as well used in RF, infrared or fiber optic communication schemes as examples.

Figure 1A:
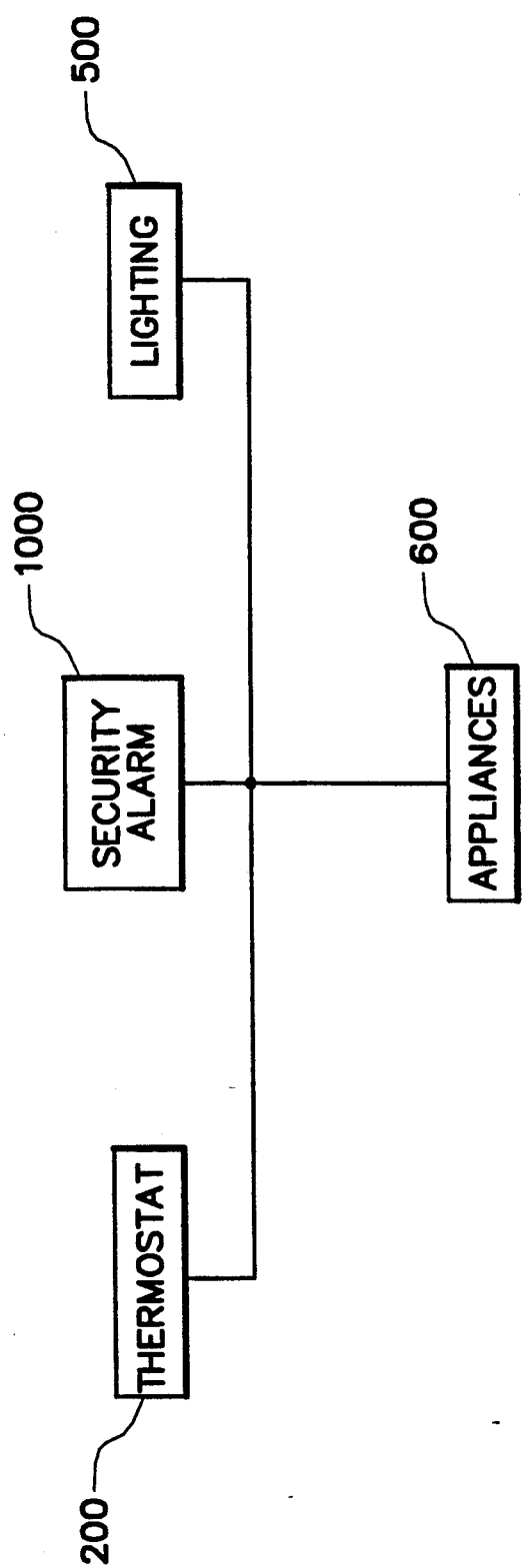
FIG. 1A shows how the thermostat unit fits into a home automation system.

FIG. 1A shows how the thermostat fits into a home automation system. The thermostat may be connected to a security alarm system 1000, lighting control system 500 and appliances control system 600 to provide a single control system for many electrical loads within a building. Each system may include a control panel, one of which may be a master control. The various systems communicate through use of a common protocol such as the protocol disclosed in copending U.S. patent application Ser. No. 07/811,772 entitled DC BALANCED 4B/8B BINARY BLOCK CODE FOR DIGITAL DATA COMMUNICATIONS by Meyers which is commonly assigned with the present application.

Figure 2:
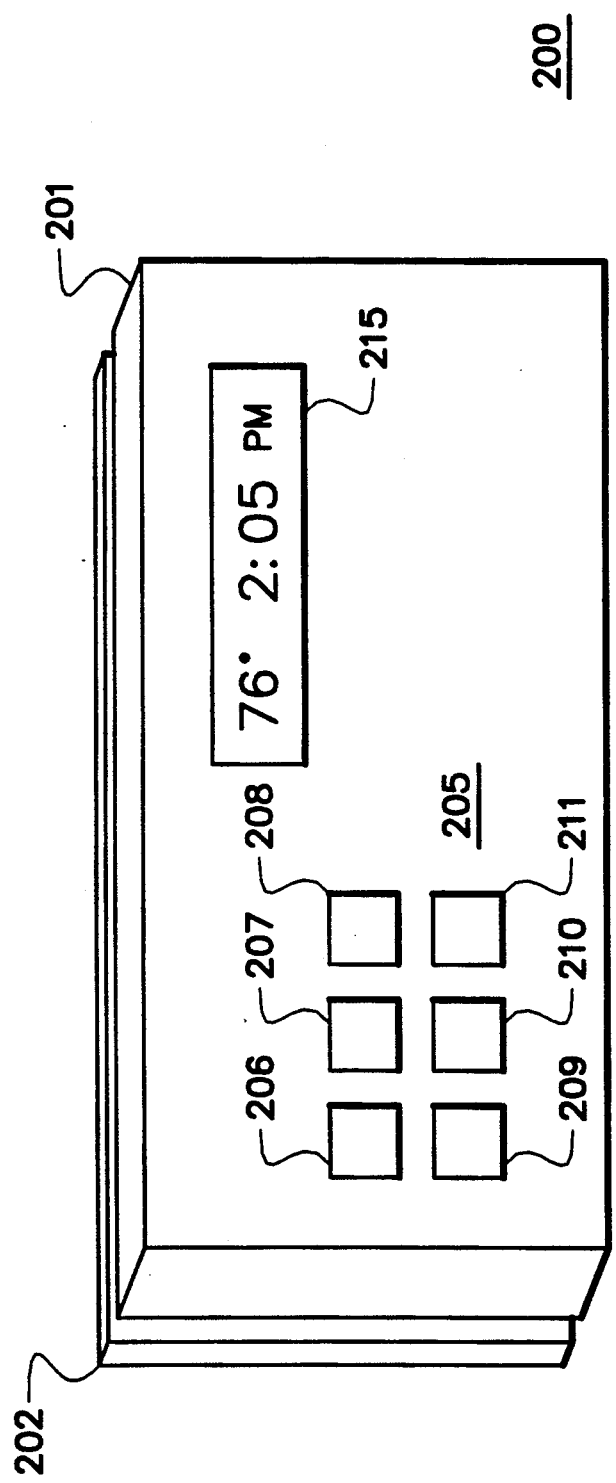
FIG. 2 shows a physical representation of an exemplary thermostat.

FIG. 2 shows physical construction of the thermostat unit of the present invention. Thermostat 200 is made up of thermostat housing 201 and subbase 202.

Temperature sensor 14, display means 215 and data entry means 205 are physically located in the thermostat housing 201. Data entry means 205 in this case is a keyboard comprising keys 206 through 211. The keys can be used to input data into the thermostat in a method well known in the art.

Figure 3A:
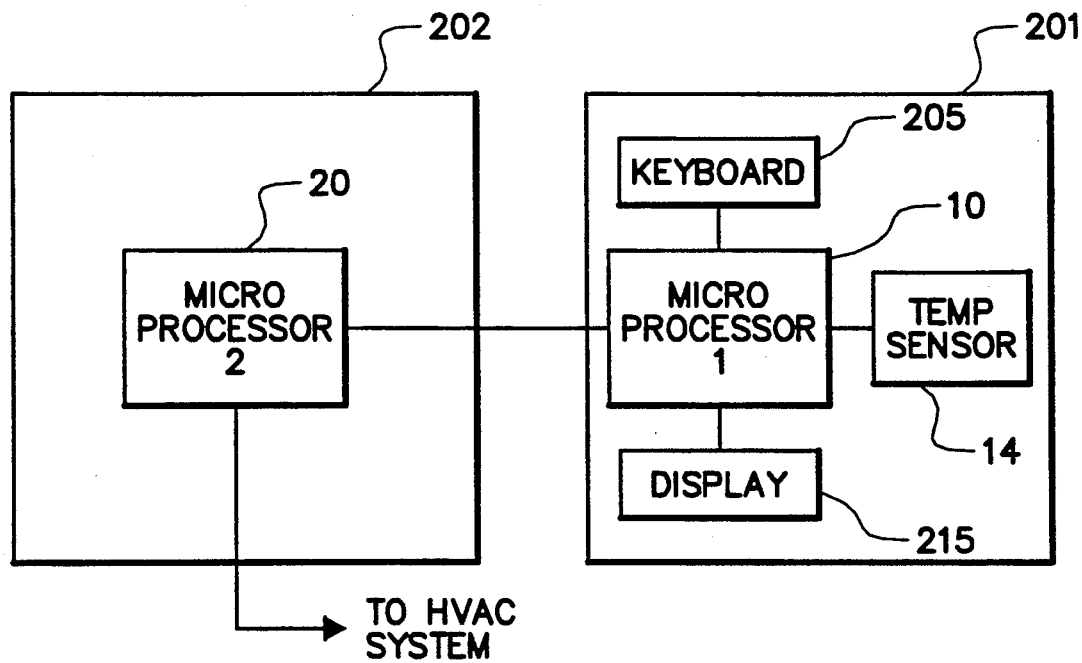
FIGS. 3A, 3B, 3C and CD all show possible physical locations of the first and second microprocessors.
Figure 3B:
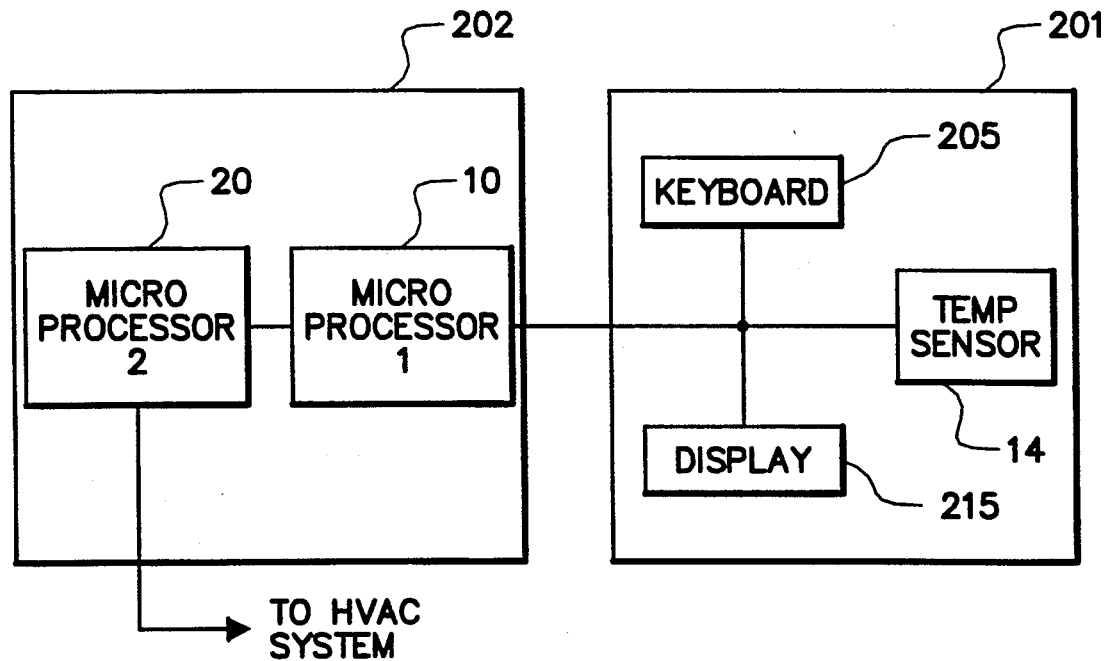
Figure 3C:
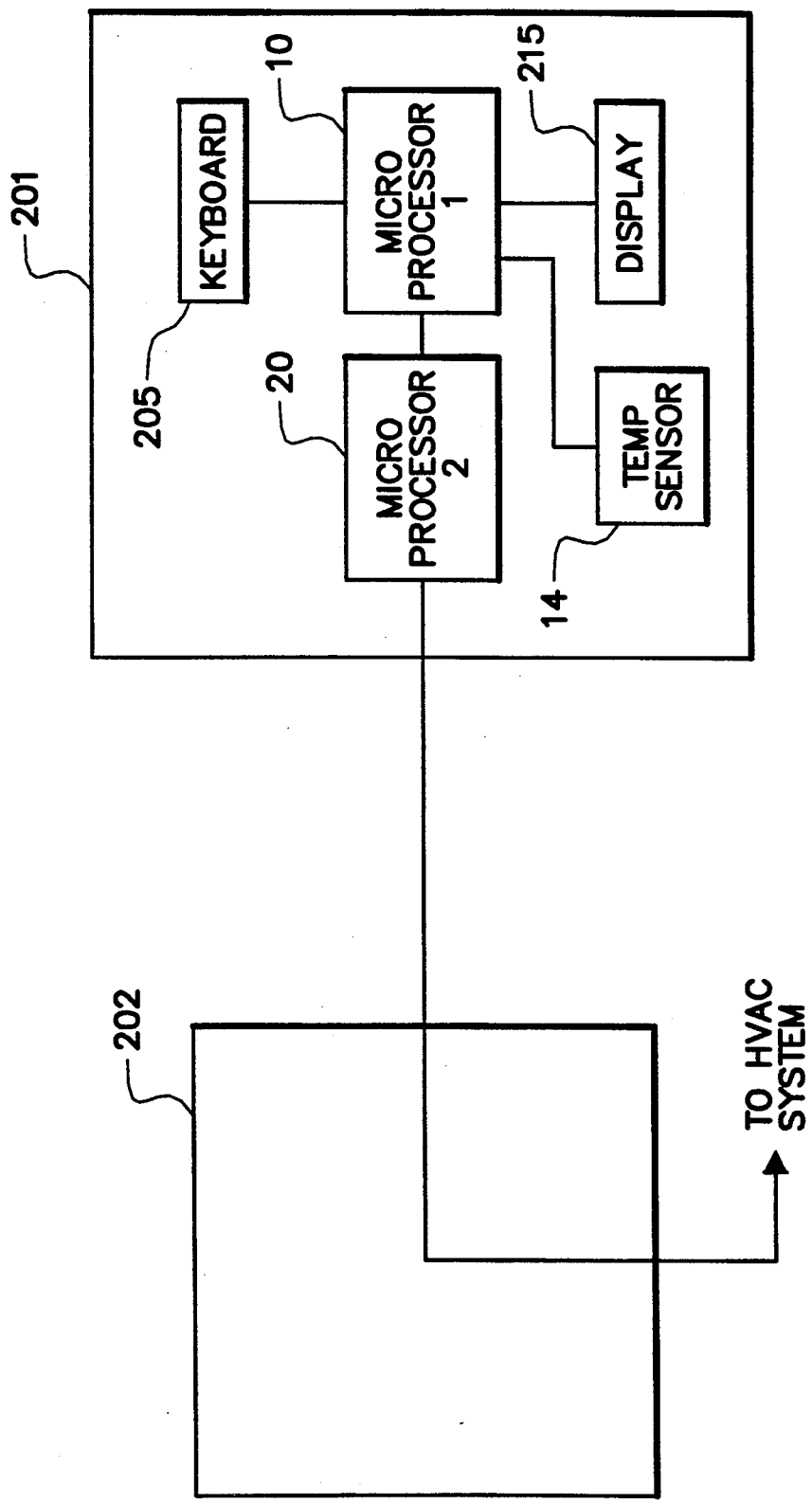
Figure 3D:
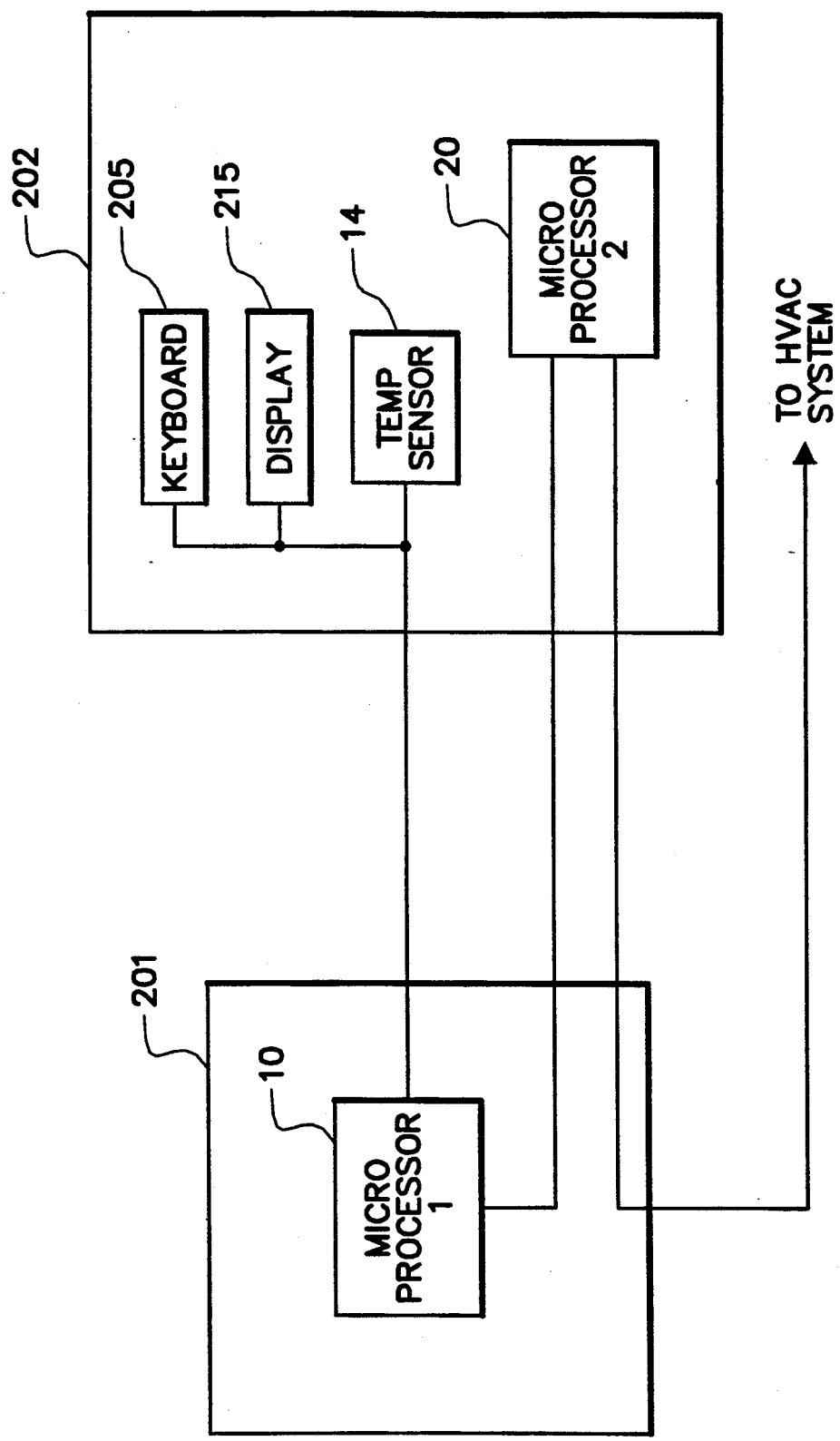

Turning now to FIGS. 3A, 3B 3C and 3D, there-shown are four possible configurations of locations for the first and second microprocessors 10 and 20. In FIG. 3A, first microprocessor 10 is located in the thermostat with keyboard 205, temperature sensor 14 and display 215. In FIG. 3B, both microprocessors are located in subbase 202 while the keyboard display and temperature remain in the thermostat 201. In FIG. 3C, both microprocessors are located in the thermostat along with the temperature sensor display and keyboard. In FIG. 3D, the first microprocessor is located in the subbase while the second microprocessor is located in the thermostat housing.

Separation of the thermostat unit into the thermostat housing and subbase provides a number of advantages. First, placement of the thermostat without replacement of the subbase saves a large amount of time. Separation of the two microprocessors with at least one microprocessor being located in the subbase allows a new thermostat housing having a new microprocessor and new functions to be added to the subbase without the attendant cost of complete replacement of the thermostat. Therefore, with future advances in the thermostat art, a new thermostat housing could be hung on an old subbase and provide new functionality without the cost of completely replacing a thermostat.

The foregoing has been a description of a novel and nonobvious communicating thermostat having a plurality of microprocessors. The inventors do not intend to be limited by the foregoing description, but instead describe the limits of their property in the claims appended hereto.

I claim:

1. A thermostat for control of an HVAC system, comprising:
    a temperature sensor for producing a temperature signal indicative of a local temperature;
    data entry means for entering time and temperature data into the thermostat;
    a clock, for producing a real time signal indicative of real time;
    data entry means for entering time and temperature data into the thermostat and for requesting display of thermostat data;
    a display means, connected to said data entry means, said temperature sensor and said clock, for displaying said time and temperature data, said real time and said local temperature, said data entry means being capable of modifying said display means;
    a first microprocessor connected to said temperature sensor, said data entry means, said clock, and said display means, said first microprocessor receiving data, said temperature signal and said real time signal and controlling said display means;
    a second microprocessor connected to said first microprocessor, said second microprocessor controlling the operation of the HVAC system in accordance with prestored instructions and user entered time and temperature data entered through said data entry means, said first microprocessor sending to said second microprocessor said temperature signal and said time and temperature data, said second microprocessor sending to said first microprocessor a HVAC system status, said thermostat being divided into a thermostat housing in a subbase, said thermostat carrying said data entry means, said temperature sensor, and said display means.

2. The thermostat of claim 1, wherein:
    said first microprocessor is physically located in said thermostat housing; and
    said second microprocessor is physically located in said subbase.

3. The thermostat of claim 1, wherein:
    said first and second microprocessors are physically located in said subbase.

4. The thermostat of claim 1, wherein:
    said first and second microprocessors are physically located in said thermostat housing.

5. The thermostat unit of claim 1, wherein:
    said first microprocessor is physically located in said subbase; and
    said second microprocessor is physically located in said thermostat housing.

* * * * *